(12) United States Patent
Ippatapu (10) Patent No.: US 10,871,913 B1
(45) Date of Patent: Dec. 22, 2020

(54) METHOD AND SYSTEM FOR PROCESSING DATA IN A REPLICATION SYSTEM

(71) Applicant: EMC IP Holding Company LLC, Hopkinton, MA (US)

(72) Inventor: Venkata LR Ippatapu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/516,295

(22) Filed: Jul. 19, 2019

(51) Int. Cl.
*G06F 3/06* (2006.01)
*G06F 9/50* (2006.01)

(52) U.S. Cl.
CPC ............... *G06F 3/065* (2013.01); *G06F 3/061* (2013.01); *G06F 3/067* (2013.01); *G06F 3/0614* (2013.01); *G06F 9/5027* (2013.01)

(58) Field of Classification Search
CPC ........ G06F 3/065; G06F 3/061; G06F 3/0614; G06F 3/067; G06F 9/5027
See application file for complete search history.

(56) References Cited

U.S. PATENT DOCUMENTS

| 2009/0030986 | A1* | 1/2009 | Bates | G06F 3/065 709/205 |
| 2010/0037038 | A1* | 2/2010 | Bieswanger | G06F 1/329 712/220 |
| 2011/0213950 | A1* | 9/2011 | Mathieson | G06F 15/8007 712/30 |
| 2012/0159496 | A1* | 6/2012 | Dighe | G06F 9/4893 718/102 |

* cited by examiner

*Primary Examiner* — Eric Caldwell
(74) *Attorney, Agent, or Firm* — Chamberlain, Hrdlicka, White, Williams & Aughtry (57) ABSTRACT

In general, embodiments of the invention relate to a method, non-transitory computer readable medium, and system for managing replication system processing. More specifically, embodiments of the invention relate to managing the dedicated set of computational resources in a replication system during runtime in order to, among other things, improve the performance of the replication system.

18 Claims, 7 Drawing Sheets

METHOD AND SYSTEM FOR PROCESSING DATA IN A REPLICATION SYSTEM

BACKGROUND

Computing devices may include any number of internal components such as processors, memory, and persistent storage. Each of the internal components of a computing device may be used to generate data. The process of generating, storing, and replicating data may utilize computing resources of the computing devices such as processing and storage. The manner in which the aforementioned computing resources are utilized may impact the overall performance of the computing resources.

SUMMARY

In general, in one aspect, the invention relates to a method for managing replication system processing. The method includes allocating a first set of cores to a replication application in a replication system, obtaining, by the replication system, data from a client device for processing by the replication application, processing the data by the replication application using the first set of cores, determining, based on the processing, a processing rate of the data by the first set of cores, making a determination that in the processing rate is greater than a breakpoint associated with the first set of cores, and based on the determination, updating the first set of cores to a second set of cores, wherein the second set of cores is allocated to the replication application.

In general, in one aspect, the invention relates to a non-transitory computer readable medium (CRM) storing instructions for managing replication system processing, the instructions comprising functionality for allocating a first set of cores to a replication application in a replication system, obtaining, by the replication system, data from a client device for processing by the replication application, processing the data by the replication application using the first set of cores, determining, based on the processing, a processing rate the data by the first set of cores, making a determination that in the processing rate is greater than a breakpoint associated with the first set of cores, and based on the determination, updating the first set of cores to a second set of cores, wherein the second set of cores is allocated to the replication application.

In general, in one aspect, the invention relates to a replication system, comprising: a replication application and a processor, wherein the replication application comprises threads for replicating input data, which when executed by the processor enables the processor to perform a method for managing replication system processing, the method comprising: allocating a first set of cores to the replication application in a replication system, obtaining, by the replication system, data from a client device for processing by the replication application, processing the data by the replication application using the first set of cores, determining, based on the processing, a processing rate the data by the first set of cores, making a determination that in the processing rate is greater than a breakpoint associated with the first set of cores; and based on the determination, updating the first set of cores to a second set of cores, wherein the second set of cores is allocated to the replication application.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method, non-transitory computer readable medium, and system for managing replication system processing. More specifically, embodiments of the invention relate to managing the dedicated set of computational resources (also referred to as cores) in a replication system during runtime in order to, among other things, improve the performance of the replication system. In one or more embodiments of the invention, the performance of various combinations of cores are evaluated offline (i.e., not during runtime) in order to determine core profiles. The aforementioned core profiles may then be used during runtime to dynamically allocate an appropriate number of cores in order process the current workload of the replication system.

Figure 1:
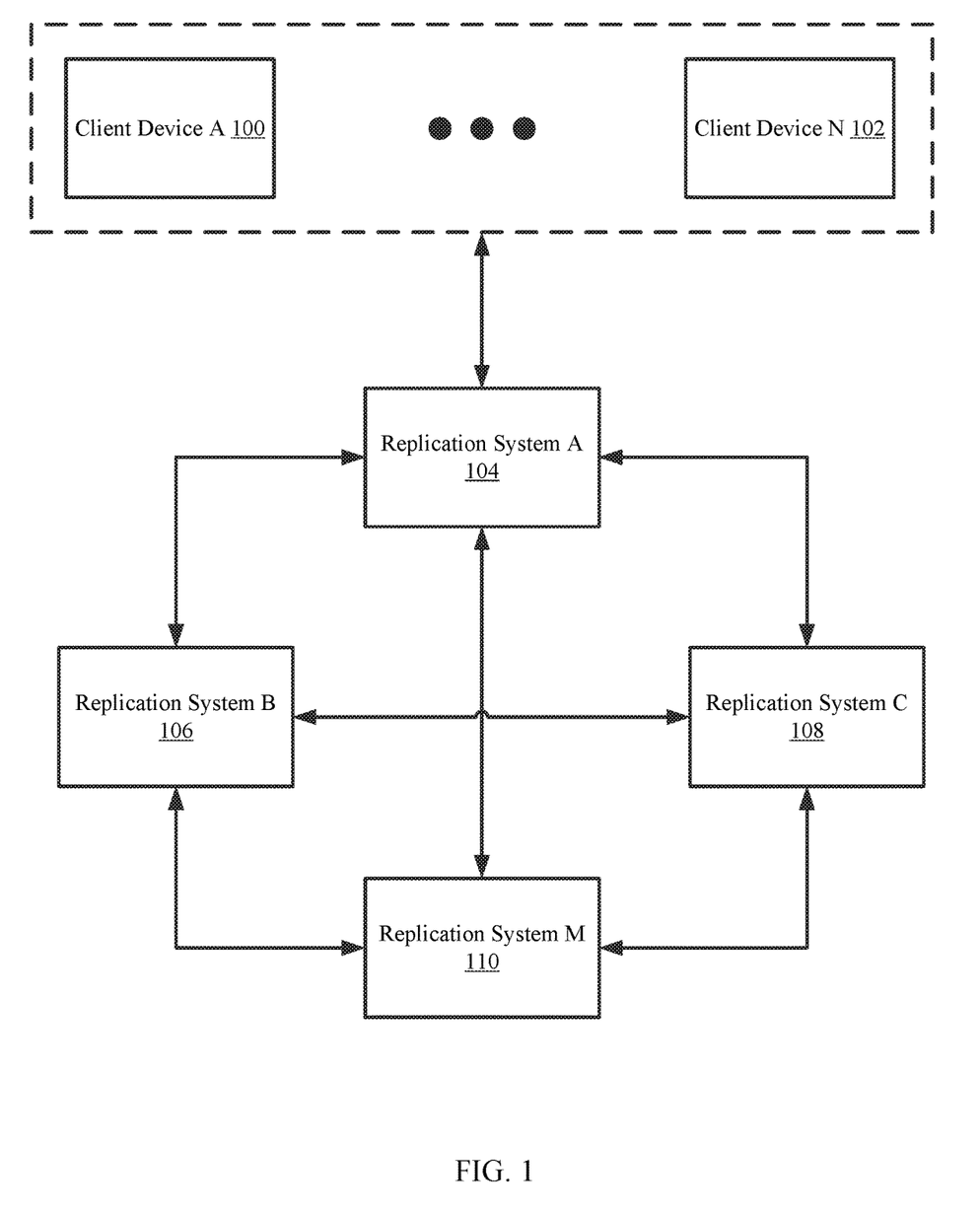
FIG. 1 shows a system in accordance with one or more embodiments.

FIG. 1 shows an exemplary system for replicating data, in accordance with one or more embodiments of the technology. The system includes client devices (100, 102) and multiple of replication systems (104, 106, 108, and 110). Further, the aforementioned components may communicate using any combination of wired and/or wireless connections and wired and/or wireless networks. Each of the aforementioned components is described below.

In one or more embodiments of the invention, the client devices (100, 102) are devices, operated by users, which send data to replication systems (104, 106, 108, 110) for processing by a replication application (not shown) executing thereon.

In one or more embodiments of the invention, the client devices (100, 102) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a client devices described throughout this application.

In one or more embodiments of the invention, the client device (100, 102) may be implemented as a logical device. The logical device may utilize the computing resources of any number of computing devices and thereby provide the functionality of the client devices (100, 102) described throughout this application.

In one or more embodiments of the invention, each of the replication systems (104, 106, 108, 110) may provide synchronous and asynchronous replication.

In one or more embodiments, synchronous replication is when data must be written to a replication system (i.e., the replication system that received the data from the client device) and to at least one other replication system before the write is acknowledged to the client device (100, 102).

In one or more embodiments, during asynchronous replication, data from a client device are received and stored in a replication system. Once the data is saved, the write is acknowledged to the client device (100, 102). Thereafter, the replication system replicates the data and transmits the data to at least one other replication system at a scheduled time.

In one or more embodiments of the invention, the replication system may have a cascading topology. In a cascading topology, data from a client device may be replicated to a replication system. This replication system may then transmit a copy of the data to at least one other replication system to an additional replication system. For example, as shown in FIG. 1, the replication systems are operatively connected to each other to permit data received from replication system A to be propagated, directly or indirectly, to the other replication systems (e.g., replication systems B, C, and M).

In one or more embodiments of the invention, the replication systems (104, 106, 108, 110) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a replication system described throughout this application.

In one or more embodiments of the invention, each replication system (104, 106, 108, 110) may be implemented as a logical device. The logical device may utilize the computing resources of any number of computing devices and thereby provide the functionality of the replication systems (104, 106, 108, 110) described throughout this application. Additional detail about the replication systems is shown in FIG. 2.

While FIG. 1 shows an specific system architecture, the invention is not limited to the system architecture shown in FIG. 1. Specifically, the system may include a different number of replication systems and/or different connectivity between the replication systems and the client devices.

Figure 2:
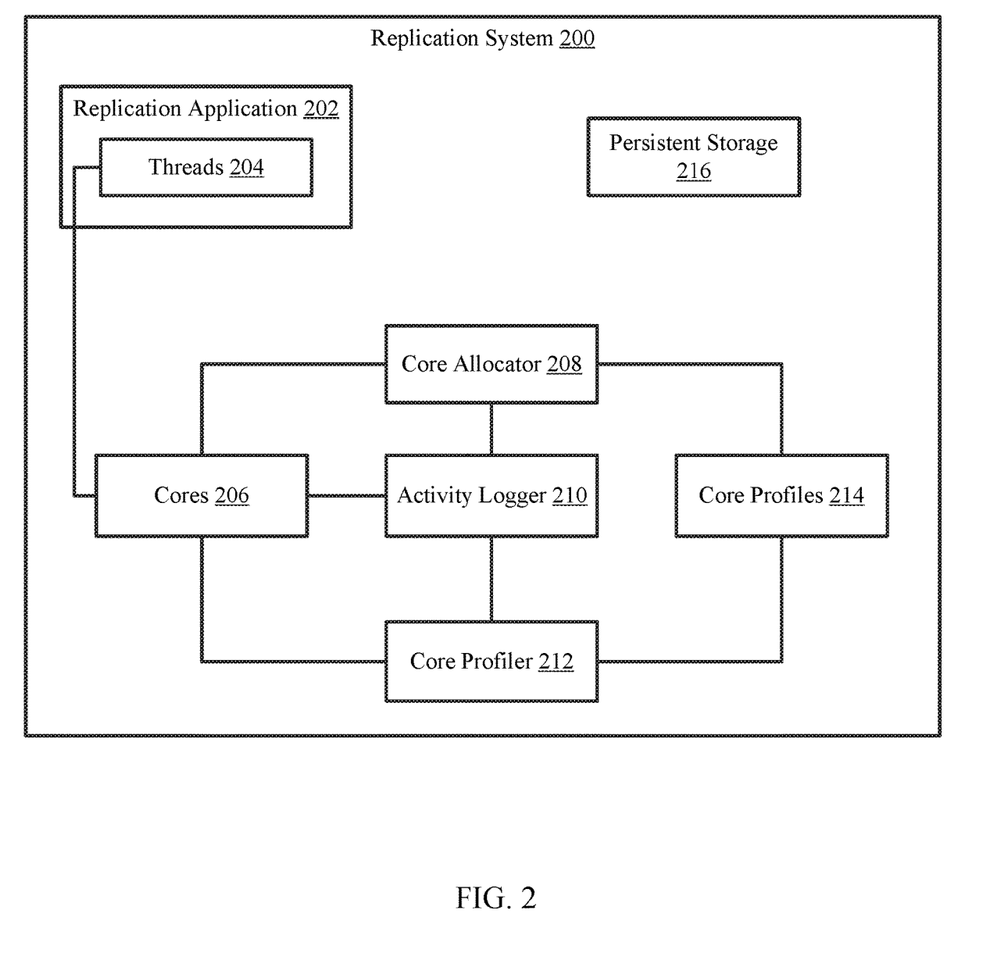
FIG. 2 shows a replication system in accordance with one or more embodiments.

FIG. 2 shows a replication system in accordance with one or more embodiments. The replication system (200) includes a replication application (202) with threads (204), cores (206), a core allocator (208), an activity logger (210), a core profiler (212), core profiles (214), and persistent storage (216). Each of these components is described below.

In one or more embodiments of the invention, the replication application (202) may provide synchronous and asynchronous replication. The replication application (202) may include threads (204). The threads (204) include software jobs for implementing the functionality of the replication application. Specifically, the threads includes instructions for, among other things, replicating data received by the replication system (200) from the client device and transmitting the replicated data to other replication systems. In one or more embodiments, the threads run (or are otherwise executed) on the cores (206) (or more specifically the allocated cores) during runtime for replicating data received by the replication system from client devices.

In one or more embodiments of the invention, the replication application processes data received from the client device. The replication application stores a copy of the data to its persistent storage (216) and transmits a copy of the data to at least one other replication system.

In one or more embodiments of the invention, the cores (206) are the physical processing hardware of the replication system. The cores (206) are responsible for processing threads for replicating data received by client devices. The cores may be implemented using a field-programmable gate array, application specific integrated circuit, programmable processor, microcontroller, digital signal processor, any other processing hardware or circuitry, or any combination thereof. In one or more embodiments of the cores may be allocated individuals or in groups (as discussed below).

In one or more embodiments of the invention, an initial set of cores (206) out of the total number of cores may be allocated to the replication application (202). For example, the replication system may have ten cores available to be allocated to the replication application (202). Out of the ten cores, two cores may be initially assigned to the replication application (202).

In one or more embodiments of the invention, the allocated number of cores (206) assigned to a replication application (202) may be updated when an output throughput rate from a source replication system to a destination replication system is no longer proportional to an input rate data from a client device to the source replication system. In this context, the replication system that receives the data from the client is designated as the "source replication system" and the replication system that is receiving a copy of the data from the source replication system is designated as the "destination replication system."

In one or more embodiments of the invention, a core allocator (208) is responsible for allocating cores (206) to a replication application. The aforementioned allocation may be performed during run time. In one embodiment of the invention, the core allocator (208) receives a message to update the allocated number of cores (206) based on a processing rate being above a breakpoint. A breakpoint is a modeled processing rate of a set of cores where processing input data obtained from client devices at a rate above the breakpoint results in an exponential drop in output of the replication application compared to incoming data rate. An exponential drop may be deemed to occur when the output throughput rate from one replication system to another replication system is no longer proportional (non-linear) to the input data rate from client devices.

In one or more embodiments of the invention, the core allocator (208) may allocate the updated number of cores by comparing the performance data of the initial set of cores (206) stored in an activity logger (210) to performance data in a core profile (214). Based on the performance data for each set of cores (206) in the core profile (214), the core allocator updates the core allocation when the processing rate is above the breakpoint. Additional detail about the operation of the core allocator is provided below in FIG. 4.

In one or more embodiments of the invention, the activity logger (210) monitors the processing of the performance data received by the replication application (202) from the client device. The activity logger (210) logs the performance data of allocated set of cores (206) over a period of time. The performance data may include, but is not limited to, the current rate at which data is being received by the replication system from a client device and the current rate at which data (or more specifically copies of the data) are being transmitted to a destination replication system(s).

In one or more embodiments of the invention, the core profiler (212) may run offline tests on various sets of cores (206) (e.g., 2 cores, 3 cores, 4 cores, 5 cores, etc.) available on a replication system. The offline tests are run to obtain performance data of the various sets of cores (206). As each set of cores is tested, a core profile (214) is generated to store the performance data of each distinct set of cores (206). After the core profiler (212) runs the offline test on the various sets of cores (206) to obtain performance data of the sets of cores (206), set of cores may be allocated to the replication application (202) using this performance data in accordance with FIG. 4. Additional detail about the operation of the core profiler is provided below in FIG. 3.

In one or more embodiments of the invention, the core profiles (214) are data structures that store the aforementioned performance data for the various sets of cores. The core profiles may be stored in volatile memory (not shown) in the replication system and/or in persistent storage. Additional detail about the use of the core profiles is provided in FIGS. 3-4 below.

In one or more embodiments of the invention, the persistent storage (216) may include, but is not limited to, optical storage, magnetic storage, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

In one or more embodiments of the invention, the persistent storage (216) may store a copy of the data received from the client device. The persistent storage (216) may also include a copy of the core profiles (216).

Figure 3:
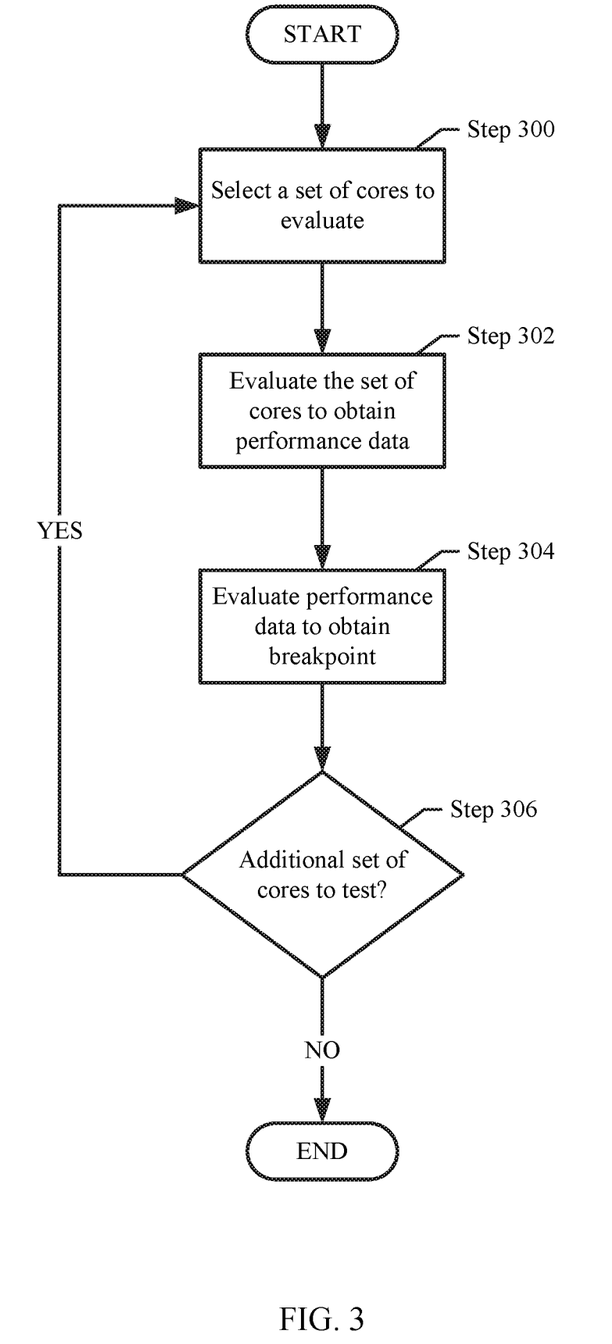
FIG. 3 shows a method in accordance with one or more embodiments.

FIG. 3 shows a flowchart describing a method for obtaining the breakpoint for sets of cores in accordance with one or more embodiments of the invention. The method shown in FIG. 3 may be performed by, for example, a core profiler (212). Other components of the system illustrated in FIG. 1 may perform the method of FIG. 3 without departing from the invention.

While the various steps in the flowchart shown in FIG. 3 are presented and described sequentially, one of ordinary skill in the relevant art, having the benefit of this instant disclosure, will appreciate that some or all of the steps may be executed in different orders, that some or all of the steps may be combined or omitted, and/or that some or all of the steps may be executed in parallel.

In Step 300, a set of cores is selected from the number of available cores in replication system to evaluate. The set of cores that is selected may correspond to any combination of cores.

In step 302, the set of cores may be evaluated to obtain performance data. In one or more embodiments, offline performance tests may be conducted on the set of cores to generate performance data. The performance tests may include subjecting the selected set of cores to workload (which increases over time) and then determining the output of set of course as the workload is increased. The workload may be a simulated set of data being sent from client devices to the replication system.

In step 304, the performance data may be evaluated to obtain a breakpoint. The breakpoint may correspond to a replication throughput processing rate (or specific workload) of the set of cores (i.e., the set of cores selected in step 300), where the processing of incoming data above the breakpoint can result in an exponential drop in output of the replication application or replication throughput is no longer proportional to input data rate. The breakpoint, which may be quantified as a specific processing rate or specific workload, is stored in the core profile along with information that identifies the set of cores (i.e., the cores selected in step 300)

In step 306, a determination is made as to whether there are additional sets of cores to test. If there are additional sets of cores to test the process proceeds to step 300; otherwise the process ends.

The result of the processing in FIG. 3 is a set of core profiles, where each of the core profiles specifies: (i) a set of cores (i.e., information that identifies the core in the set of cores) and (ii) the breakpoint for the set of core specified in (i).

Figure 4:
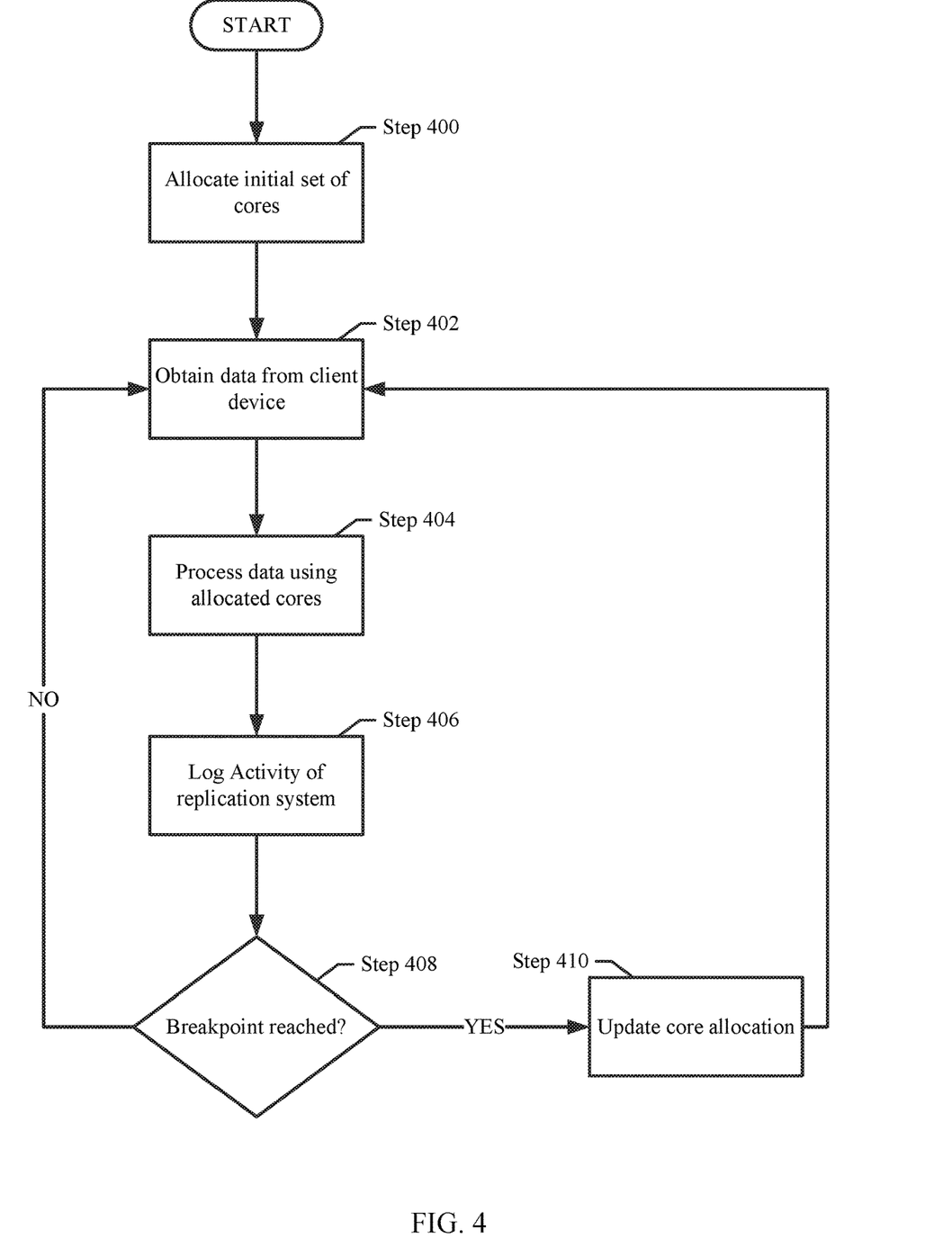
FIG. 4 shows a method in accordance with one or more embodiments.

FIG. 4 shows a flowchart describing a method for managing replication system processing in accordance with one or more embodiments of the invention While the various steps in the flowchart shown in FIG. 4 are presented and described sequentially, one of ordinary skill in the relevant art, having the benefit of this instant disclosure, will appreciate that some or all of the steps may be executed in different orders, that some or all of the steps may be combined or omitted, and/or that some or all of the steps may be executed in parallel.

In Step 400, an initial set of cores may be allocated to a replication application in the replication system. In one or more embodiments of the invention, the set of cores are assigned to a replication system during initialization time. For example, a cardinality (or number) of the initial set of cores is less than a cardinality of cores on the replication system. For example, the replication system may have 10 cores available. However, the initial set of cores allocated to a replication application may be 2 cores. The initial set of cores that are allocated may be a default number of cores.

In step 402, data may be obtained by the replication system from the client device for processing by the replication application.

In step 404, the data received from the client device by the replication application may be processed by the allocated set of cores. In one or more embodiments of the invention, the replication application may include threads that run on the initial set of cores during run time to replicate data from the client device. A copy of the replicated data may be transmitted from the replication system to another replication system(s).

In step 406, the activity logger logs the activity of the replication system. In one or more embodiments of the invention, the activity logger will monitor and log the processing rates for the allocated set of cores over a period of time.

In step 408, a determination is made as to whether the breakpoint is reached. The breakpoint may be reached when the input data processing rates of the set of cores is above the breakpoint specified for the set of cores in the corresponding core profile. In this scenario, the replication system's performance is impacted. If the breakpoint has been reached, the process proceeds to step 410. If the breakpoint has not been reached, the process proceeds to step 402.

In step 410, the core allocator updates the allocation of cores to accommodate the data input from the client device. In one or more embodiments, the replication system makes an asynchronous request to the core allocator to update the current allocation of the set of cores. The core allocator updates the set of cores based on the current workload of the replication application as specified in the activity logger. Specifically, the current workload of the replication application is used to identify one or more core profiles that include a breakpoint that is greater than the current workload of the replication application. The core allocator may then select a set of cores to allocate using one of the aforementioned identified core profiles. After a new set of cores has been allocated (which may include some of the previously allocated cores), the process proceeds to step 402.

Example

Figure 5A:
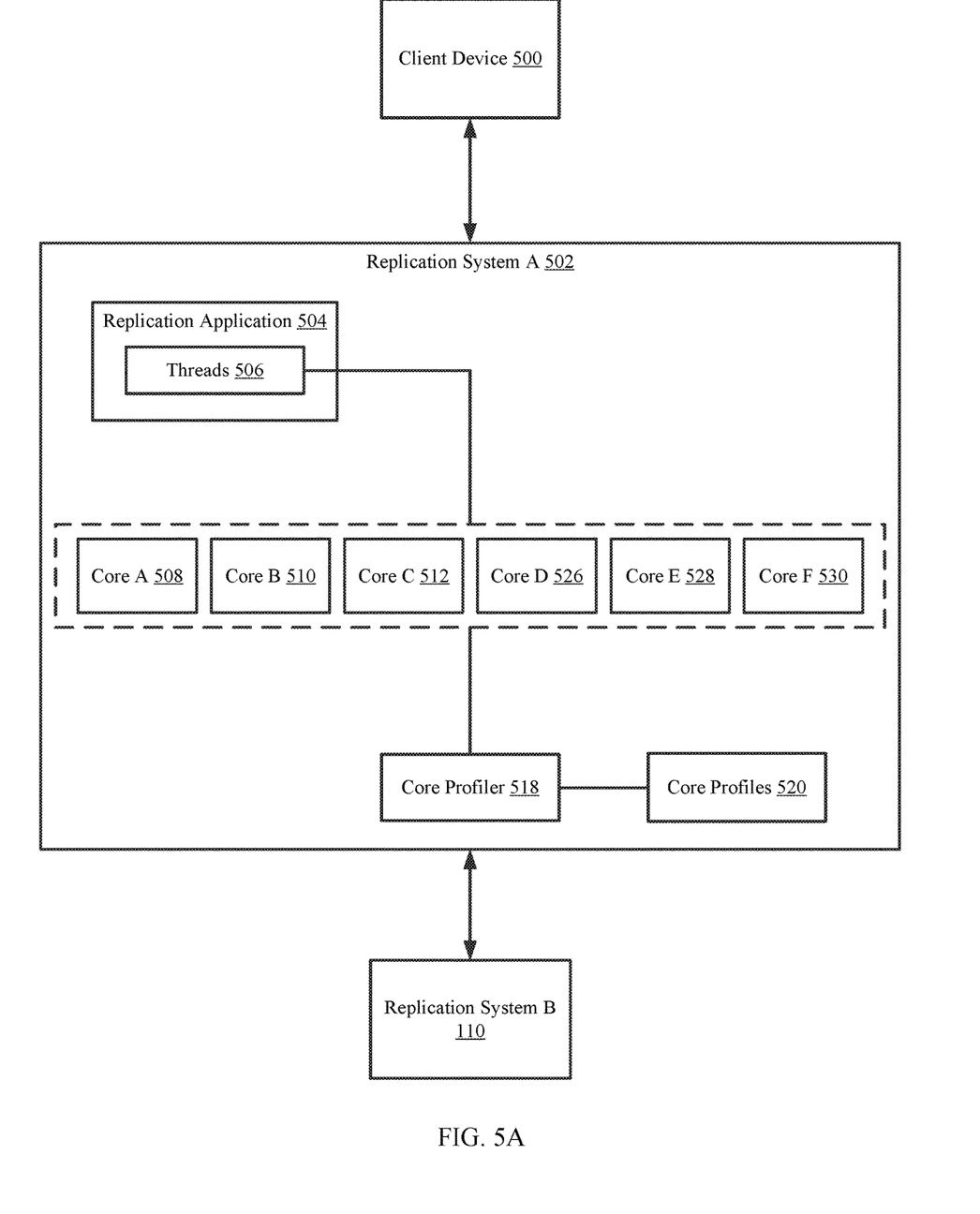
FIGS. 5A-5C show an example in accordance with one or more embodiments.
Figure 5B:
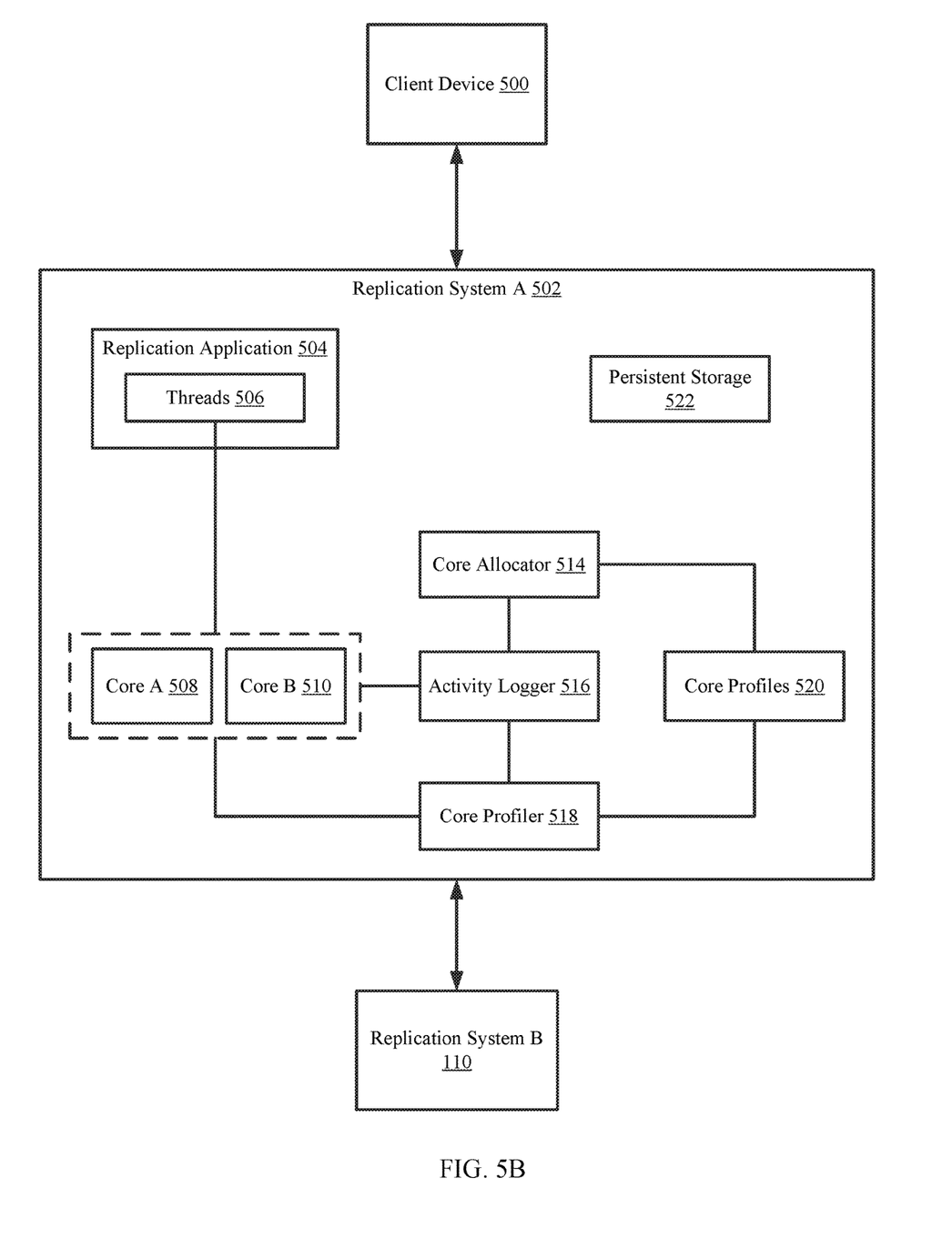
Figure 5C:
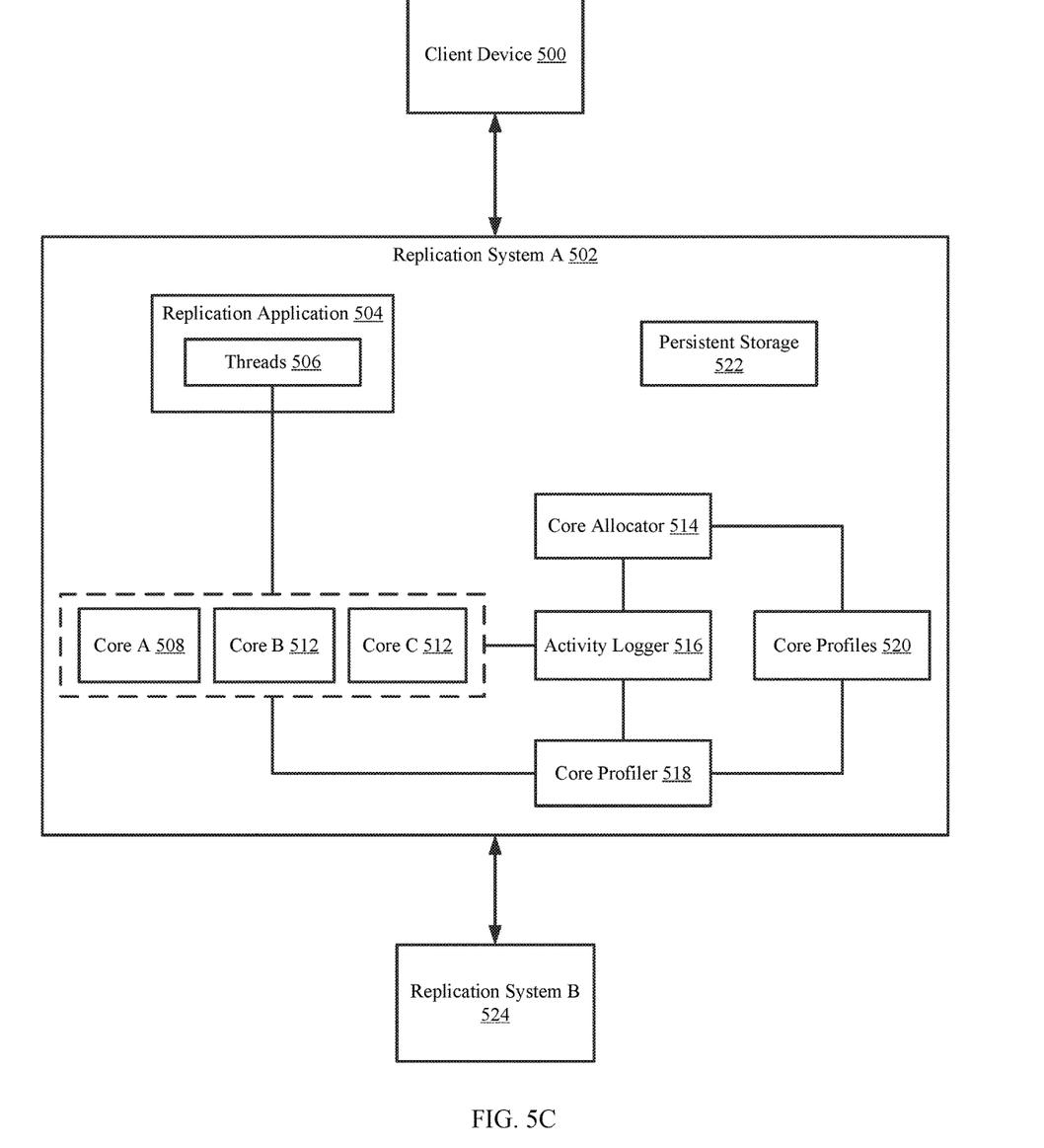

FIGS. 5A-5C show an example in accordance with one or more embodiments. The example is not intended to limit the scope of the invention.

Consider a scenario in which a replication system has six cores (i.e., core A (508), core B (510), core C (512), core D (526), core E (528), and core F (530)) available to be allocated to execute threads (506) in a replication application (504). Further assume that a first set of cores is evaluated by the replication system, where a core profiler performs offline tests to obtain performance data for the first core set of cores core A (508), core B (510)). The performance data may include the input rate of the data from a client device (500), output throughput rate of the replicated data from replication system A to replication system B, the input rate versus the output throughput rate, and a breakpoint. A core profile is created for the first set of cores. The core profile includes a breakpoint is determined for the first set of cores. Thereafter, the offline tests are run for other combinations of core A (508), core B (510), core C (512), core D (526), core E (528), and/or core F (530), where core profiles are generated for each of the other sets of cores that are tested.

Referring to FIG. 5B and continuing with the above example, consider a scenario in which a set of two cores (i.e., core A (508), core B (510)) is initially allocated to the replication system A (502) for processing the threads (506) for replicating data. Replication system A (502) receives data from a client device (500) for copying and replicating the data and stores the copied data in persistent storage. The replicated data is transmitted from replication system A (502) to replication system B (524).

As the replication application (504) is replicating data from the client device, the activity logger (516) may log the replication processing rates for the initial set of cores (i.e., core A (508), core B (510)) for a period of time.

Referring to FIG. 5C, as the initial set of allocated cores (i.e., core A (508), core B (510)) are processing the threads (506) for replicating data, the activity logger (516) logs input rate greater than breakpoint computed, which can cause a nonlinear replication throughput for the given input rate or exponential drop in the output of the replication application (504) for a given input rate. In this scenario, an asynchronous message is sent to the core allocator (514) to update set of allocated cores (i.e., core A (508), core B (510)). Based on the current workload and the previously generated core profiles, a core profile that includes core A (508), core B (510), core C (512) is selected. The newly selected set of cores is then allocated for use by threads in the replication application.

End of Example

One or more embodiments of the invention, combine the benefits of offline modeling of the replication system with the expected replication system behavior to obtain improved performance of the replication system during runtime under varying workload conditions. The throughput of the system may be improved by updating the number of cores allocated to the replication system without having any manual intervention to modify replication system resources that, prior to embodiments of the invention.

While the embodiments have been described with respect to a limited number of embodiments, those skilled in the art, having benefit of this disclosure, will appreciate that other embodiments can be devised which do not depart from the scope of the embodiments as disclosed herein. Accordingly, the scope of the embodiments should be limited only by the attached claims.

What is claimed is:

1. A method for managing replication system processing, the method comprising:
 allocating a first set of cores to a replication application in a replication system;
 obtaining, by the replication system, data from a client device for processing by the replication application;
 processing the data by the replication application using the first set of cores;
 determining, based on the processing, a processing rate of the data by the first set of cores;
 making a determination that in the processing rate is greater than a breakpoint associated with the first set of cores, wherein the breakpoint corresponds to a modeled processing rate of the first set of cores, wherein processing the data obtained from client devices at a rate above the breakpoint results in an exponential drop in output of the replication application compared to incoming data rate; and based on the determination, updating the first set of cores to a second set of cores, wherein the second set of cores is allocated to the replication application.

2. The method of claim 1, further comprising:
prior to allocating the first set of cores:
selecting the first set of cores to evaluate;
evaluating, by the replication system, the first set of cores to obtain performance data; and
determining the breakpoint associated with the first set of cores using, at least in part, the performance data.

3. The method of claim 2, wherein the performance data is stored in a core profile in the replication system, wherein the core profile specifies a cardinality of the first set of cores.

4. The method of claim 3, wherein a core profiler, executing on the replication system, obtains the performance data and determines the breakpoint using, at least in part, the performance data, wherein the core profiler generates the core profile.

5. The method of claim 1, wherein determining the processing rate comprises logging a plurality of processing rates for the first set of cores over a period of time, wherein the processing rate is one of the plurality of processing rates.

6. The method of claim 1, wherein processing the data comprises:
creating a copy of the data from the client device; and
transmitting copy of the data from the replication system to a second replication system.

7. The method of claim 1, wherein a cardinality of the first set of cores is less than a cardinality of cores on the replication system.

8. The method of claim 7, wherein a cardinality of the first set of cores is less than a cardinality of the second set of cores.

9. The method of claim 1, further comprising:
obtaining, by the replication system, second data from the client device for processing by the replication application;
processing the second data by the replication application using the second set of cores;
determining, based on the processing of the second data, a second processing rate of the data by the second set of cores;
making a second determination that the second processing rate is less than the breakpoint associated with the second set of cores; and
based on the second determination, not modifying a cardinality of the second set of cores.

10. A non-transitory computer readable medium (CRM) storing instructions for managing replication system processing, the instructions comprising functionality for:
allocating a first set of cores to a replication application in a replication system;
obtaining, by the replication system, data from a client device for processing by the replication application;
processing the data by the replication application using the first set of cores;
determining, based on the processing, a processing rate of the data by the first set of cores;
making a determination that in the processing rate is greater than a breakpoint associated with the first set of core, wherein the breakpoint corresponds to a modeled processing rate of the first set of cores, wherein processing the data obtained from client devices at a rate above the breakpoint results in an exponential drop in output of the replication application compared to incoming data rate; and
based on the determination, updating the first set of cores to a second set of cores, wherein the second set of cores is allocated to the replication application.

11. The CRM of claim 10, further comprising functionality for:
prior to allocating the first set of cores:
selecting the first set of cores to evaluate;
evaluating, by the replication system, the first set of cores to obtain performance data; and
determining the breakpoint associated with the first set of cores using, at least in part, the performance data.

12. The CRM of claim 11, wherein the performance data is stored in a core profile in the replication system, wherein the core profile specifies a cardinality of the first set of cores.

13. The CRM of claim 12, wherein a core profiler, executing on the replication system, obtains the performance data and determines the breakpoint using, at least in part, the performance data, wherein the core profiler generates the core profile.

14. The CRM of claim 10, wherein determining the processing rate comprises logging a plurality of processing rates for the first set of cores over a period of time, wherein the processing rate is one of the plurality of processing rates.

15. The CRM of claim 10, wherein processing the data comprises:
creating a copy of the data from the client device; and
transmitting copy of the data from the replication system to a second replication system.

16. The CRM of claim 10, wherein a cardinality of the first set of cores is less than a cardinality of cores on the replication system.

17. The CRM of claim 16, wherein a cardinality of the first set of cores is less than a cardinality of the second set of cores.

18. A replication system, comprising:
a replication application and
a processor,
wherein the replication application comprises threads for replicating input data, which when executed by the processor enables the processor to perform a method for managing replication system processing, the method comprising:
allocating a first set of cores to the replication application in a replication system;
obtaining, by the replication system, data from a client device for processing by the replication application;
processing the data by the replication application using the first set of cores;
determining, based on the processing, a processing rate of the data by the first set of cores;
making a determination that in the processing rate is greater than a breakpoint associated with the first set of cores, wherein the breakpoint corresponds to a modeled processing rate of the first set of cores, wherein processing the input data obtained from client devices at a rate above the breakpoint results in an exponential drop in output of the replication application compared to incoming data rate; and
based on the determination, updating the first set of cores to a second set of cores, wherein the second set of cores is allocated to the replication application.

* * * * *